Aug. 27, 1929.  N. H. BLOMGREN  1,726,380
PISTON PACKING
Filed July 22, 1926
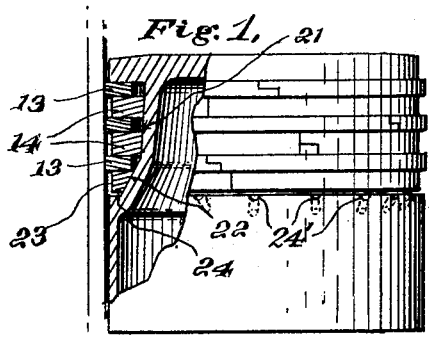
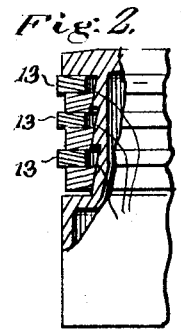
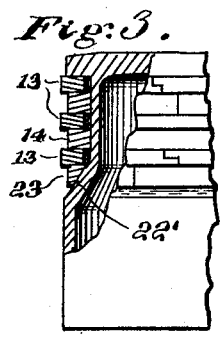
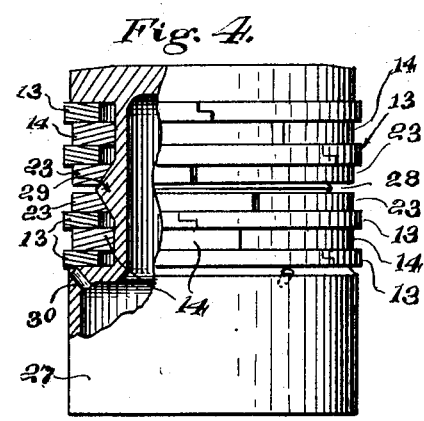
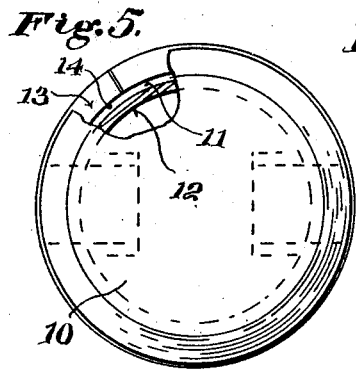
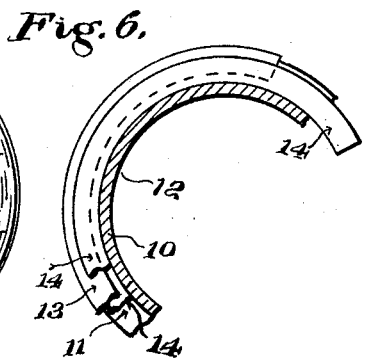
Inventor:
Nils H. Blomgren,
By H. S. Woodward,
Attorney.

Patented Aug. 27, 1929.

1,726,380

UNITED STATES PATENT OFFICE.

NILS H. BLOMGREN, OF BROOKLYN, NEW YORK.

PISTON PACKING.

Application filed July 22, 1926. Serial No. 124,252.

The invention has for its object to effect improvements in the construction of pistons and packing means therefor, particularly valuable in internal combustion engines. Another object is to simplify and cheapen the construction of pistons and packings. It is an object to enable the use of a one-piece piston in which only a single grooving operation is required in manufacture, in which less material will be required in the piston and in which the assembly of packing devices may be purely mechanical in requiring no refined fitting on the part of the worker assembling the parts, nor extreme nicety in the adherence to standard measurements in the production of the piston, nor in the manufacture of the packing elements.

It is an extremely important aim of the invention to enable the accomplishment of these ends by the use of packing rings of the familiar simple solid type.

It is an important aim of the invention to present novel construction in the specific embodiment of parts, as may be more readily understood hereinafter, and additional objects, advantages and features of invention reside in the construction, arrangement and combination of parts, as will be understood from the description and accompanying drawings herein, where—

Figure 1 is an elevational view of a piston embodying my invention, with parts broken away, showing the groove and packing element in vertical section.

Figures 2, 3, and 4 are views of a like order, each illustrating an individual modification of the invention.

Figure 5 is a top view of a piston constructed in accordance with my invention, with a portion broken away, showing a packing ring and land fitted in the piston groove.

Figure 6 is a horizontal sectional view of a portion of the piston immediately adjacent one of the lands, looking downward.

There is illustrated a piston 10 of a simple type adapted to be mounted on a connecting rod in the usual way, and instead of the series of grooves now customarily formed at the upper part, a single groove 11 is formed of a width longitudinally of the piston slightly greater than the aggregate distance from the outer side of the topmost groove in the ordinary piston to the lower side of the lower groove of the series usually formed at the upper part of the ordinary piston. This groove is of a simple form the bottom of which is cylindrical and the sides of which are planiform and in planes at right angles to the axis of the cylinder. In the production of the casting for this piston, the deepened wall 12 at the upper part of the piston in which the grooves are to be formed is made of approximately the same extent longitudinally of the piston as in ordinary practice, but to facilitate machining, with my ring it is practicable to form the pattern of the casting with a groove therein slightly less in depth and width longitudinally of the piston than the finished groove 11 is to be, so that less material will be used in the casting, as well as less material required in the finished piston. This groove may be machined to a proper finish, very much less material requiring removal than in forming ordinary grooves in the ordinary way.

In this groove I use alternate packing rings 13 of the simple solid mitered or step joint type, and lands. The lands are also rings with a break at one point, so that they may be slipped over the piston in the same manner that the packing rings 13 are, but contrary to the practice in packing rings, these lands are formed so that they tend to contract diametrically in a manner directly the reverse of the action of the packing rings, so that the lands tend to assume a size interiorly less than the external diameter of the piston at the bottom of the groove 11, and they are shaped to fit in intimate contact with the bottom of the groove throughout the length of the lands. The break in each may be in the form of a simple cut radially of the ring, or any familiar type of mitre or other joint employed, as discretion may dictate. It is also to be noted that the lands are of a thickness between their inner and outer faces—that is, radially—less than the depth of the groove in the piston, so that when they are fitted in the groove, their outer peripheral faces are set inwardly from a projection of the peripheral face of the piston. This is a very slight difference, however, and is somewhat exaggerated in the drawings, particularly in Figure 6, in order to illustrate the difference in the characteristics of the elements. The lands are preferably of a thickness longitudinally of the piston, the same as, or slightly greater than that of the packing rings, in the same direction, although this relative proportion of the parts may be varied as experience and discretion may show to be desirable.

The difference in diameter of the lands when fitted in the groove and the diameter of the piston adjacent the groove is not more than one one-thousandth of an inch, and is intended to obviate the liability of damage to cylinders or difficulty in fitting due to variations from standard, or other imperfections. The oil film and oil dams (that is, bodies of oil which may act as dams to the passage of gases) normally built up in a motor in which the invention is utilized will fill the spaces between the lands and the cylinder walls, and in time the pistons will become worn until the lands fit the cylinder the same as the body of the piston.

In the operation of a motor equipped with this invention it is well understood that the wear of the cylinder walls is greater at certain parts than at others, and it is necessary for the rings 13 to constantly expand and contract in following the longitudinal contour of the cylinder walls, so that there will be a slight degree of wear upon the mutually abutting surfaces of the packing rings and lands, as well as the upper side of the groove in the piston, and as such wear occurs all of the packing rings and lands may be moved bodily longitudinally of the piston so as to maintain constantly the snug bearing between their mutually abutting faces, which is one of the most important desiderata now recognized in the art. In the readjustment the lands all maintain their snug fit upon the bottom of the piston groove. This, in conjunction with oil accumulated in the groove will oppose passage of gases to or from the spaces behind the rings, as is readily understood. Leakage is further opposed by forming a snug joint in the break of the land, and where there is a tendency for leakage inwardly or outwardly from the space behind a ring, oil will accumulate in this space until partly or completely filled, impeding such leakage. The rings and lands properly manufactured, however, will have a continuous bearing throughout their circumference and manufacture to attain this end is easily accomplished.

In Figure 1 the groove 21 of the piston accommodating the rings and lands is deeper at its upper end, with a slightly conical form in its major upper part 21, and a lower conical face 22 having a greater vertex angle, both vertexes being above. The upper and the intermediate lands 14 have inner faces conforming to the shape of the face 21 of the groove bottom, while the lowermost land 23 has an inner face conforming to that of the face 22 of the groove, so that by inherent contractional action of the land 23 it maintains a seal against the packing ring and the bottom of the piston groove, and also by its tendency to slide upon the surface 22, compresses all of the rings and lands toward one side of the piston groove. The face 22 extends a distance above the lower face of the lowermost packing ring in the groove, so as to afford ample movement for the parts in compensating for wear or variation in size. It will be noted that the face 22 does not intersect the periphery of the piston, but terminates at a planiform side face 24 of slight extent radially, in which there are formed a series of oil drains 24'.

Figure 3 differs from Figure 1 in that the upper part of the piston groove is formed with a cylindrical bottom, enabling the use of two lands 14 rectangular in cross section between the packing rings 13, and a contractile land 23 at the lower part—the same as described in connection with Figure 1—the conical face 22' at the lower side of the groove corresponding to the face 22 before mentioned, but intersects the peripheral face of the piston without the side portion 24.

In Figure 2 a construction is shown in which interchangeable packing rings and lands are employed, or, in other words, all of the packing rings are alike, and all of the lands are alike. In this case, the piston groove is formed with upper and lower planiform side faces, while the bottom of the groove comprises three conical sections of identical form except that the lower one may be of slightly greater extent longitudinally of the piston. The vertex angle of all the conical sections is the same. Each conical section is nearly or quite equal in altitude longitudinally of the piston to the aggregate measurement of one ring and one land longitudinally of the piston. Their minor diameters are all in the direction of the top of the piston. When a series of lands and rings are assembled alternately, beginning with a ring at the top, each land will engage upon the lower part of the conical element, with a tendency to slip thereon and thrust the ring toward the head of the piston. The inner faces of the lands may be shaped to conform to the faces of the conical elements.

A quite distinct effect is produced by the construction in Figure 2 which will be found preferable and of especial advantage in certain situations. Thus, it will be appreciated that in the lowermost packing ring the pressure by which it is held against the next adjacent land above will be only that exerted by one land below. The pressure of this land is transmitted also to the next adjacent land above and to the second ring and likewise to the topmost ring. In addition, cumulatively each succeeding land above exerts an additional like force in compressing the next ring toward the upper side of the groove, and therefore the uppermost ring will be held against the upper side of the groove with three times the force that is exerted upon the lowermost ring. The second ring will be pressed with twice the force of the lower ring. In this way, in case of extremely high compression motors such pressures may be adequately opposed by the first ring while yet the lower rings will not be so severely compressed and expansive action impeded, yet accomplishing all of this by a single form of rings and lands. It will be understood that where a leakage past the first ring occurs in a slight degree, owing to the element of time involved before an equal pressure may be exerted against the second ring, the second ring will not require equal support, in practice, and should leakage occur past the first two rings, still less pressure will be exerted against the third ring within a moderate interval of time. Ordinarily this is within the period of compression and working stroke. In this way, the lower rings will be impeded to a minimum degree in their radial movement while yet maintaining an adequate snug engagement with the next adjacent surfaces above.

In Figure 4 the piston 27 has a groove 28 of much greater dimension longitudinally of the piston, but medially thereof the bottom of the groove is formed with a raised portion 29 having oppositely sloped conical sides. Two series of rings and lands are introduced in respective sides of this groove, the inner land elements of which, however, are shaped like the land 23 of Figures 1 and 3 engaged on respective sides of the enlargement 29, so that each of the lands 23 exerts longitudinal pressure against respective series of rings and lands 13 and 14 in the groove.

It will be noted that the packing ring elements are of identical construction in all of the various forms illustrated, which may be common packing rings of ordinary manufacture, and the land elements also are adapted to be produced by corresponding processes and other practices well understood, and involving low cost for manufacture.

By the construction presented lengthy and tedious fitting operations now involved when it is desired to use ordinary rings are obviated, and many operations involved in fitting pistons for the reception of rings are also obviated by the utilization of my invention. In fitting of rings ordinarily, each ring must be tested in its respective groove to see that it does not bind therein and yet does not have too much play to permit excessive leakage or oil pumping, while in my device no such fitting operation is required in any groove, but the rings and lands simply introduced in proper order, the parts thereby coacting to effect an automatic fitting of the rings in the spaces between the lands corresponding to the ordinary piston ring grooves, but with, in addition, a yielding compression of the rings between the groove sides.

If desired, with or without bevelling or other relief of the lower peripheral edge of the groove in any of the forms of piston described, apertures 30 such as shown in Figures 7 and 8 may be formed, leading from the interior of the piston to the lower side of the groove, whereby oil may be led into the pistons in accordance with usual practices in the art.

The proportions of the rings 23, the slope of the surfaces of the piston engaged thereby and the location of the elements on the piston may be modified as experience dictates. Thus the surfaces such as at 22 in Figure 1 may be at a greater angle to the axis of the piston, or the sloping side of the groove may be located next the head of the piston, especially where high compression is involved, and the latter arrangement has been found preferable in certain installations, when but one sloping part is used.

I claim:

1. In a piston and packing comprising a piston body having a broad groove and a multiplicity of resilient alternated packing rings and lands in the groove, said packing rings being larger than the piston and compressible, said land rings being contractile and engaging the bottom of the groove under their inherent stress, the bottom of said groove comprising a series of conical elements all sloping in the same direction equal in number to the number of lands, said lands having correspondingly sloping inner faces each conical element on the piston extending from under one land a distance under the next packing ring in the direction of the minor diameter of said conical element.

2. A piston and packing for internal combustion engines comprising a piston having a circumscribing packing groove of a width to receive a succession of packings, a packing ring and land therein, the first larger than the piston and adapted to be circumferentially compressed for packing engagement with a cylinder, the land being smaller than the piston and tending to contract on the bottom of the groove by inherent stress, the groove having a bottom slope under the land and being open thereover, and the land being disposed and shaped to contract upon and tend to slide on the sloping part toward the packing ring, whereby the latter is held snugly against a surface opposite from the land.

3. A piston and packing for internal combustion engines comprising a piston having a circumscribing groove of a width to receive a succession of packings, a series of alternated resilient packing rings and resilient land rings therein, the first larger than the piston and adapted to be circumferentially compressed for packing engagement with a cylinder, the lands being smaller than the piston and adapted to contract to a tight fit on the piston by the inherent stress of the land, the groove having at least one sloping face adjacent at least the outermost land of the series in one direction, said face being outwardly divergent from the series and such outermost land at least being formed with part adapted to engage and slide on the sloping face, whereby alternate packing contacts on a cylinder and the inner body of the piston may be formed, and whereby one of the contacts serves additionally to cause compression of the entire group together and against the side of the piston groove.

In testimony whereof I affix my signature.

NILS H. BLOMGREN.